Nov. 24 1925.　　　　　J. M. HAMMOND　　　　　1,562,757
METHOD AND APPARATUS FOR PRODUCING HALFTONE DOT IMAGES
Filed March 15, 1922
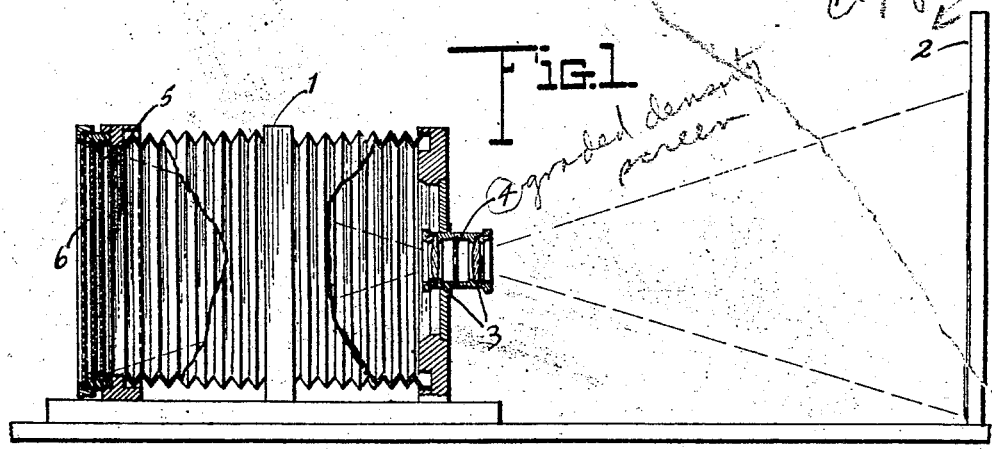
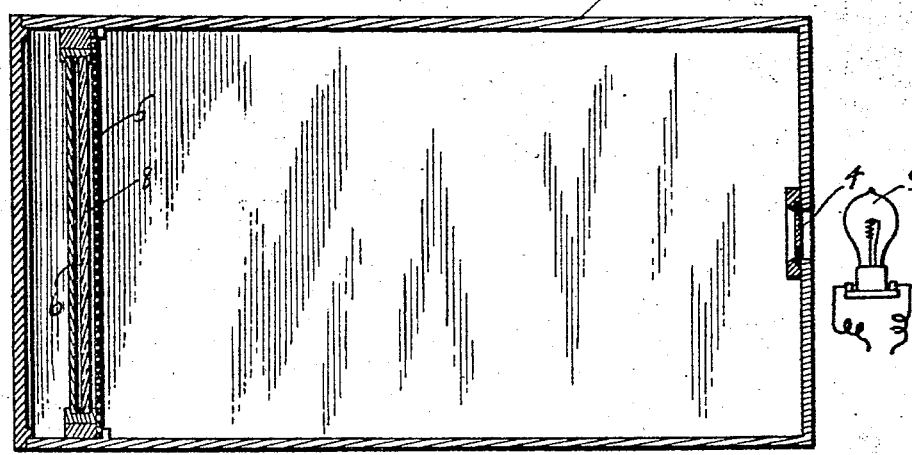
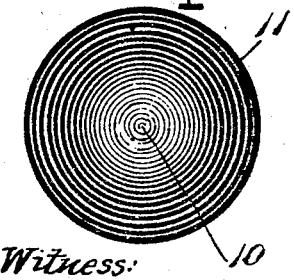
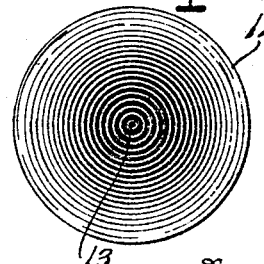
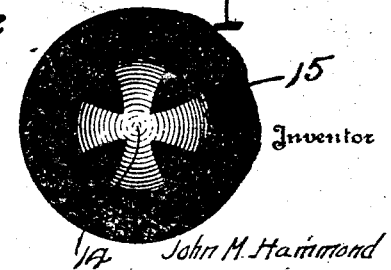
Witness:　　　　　　　　　　　　　Inventor
C. H. Wagner　　　　　　　　　　John M. Hammond
　　　　　　　　　By　　　　　　J. H. Waters
　　　　　　　　　　　　　　　　　Attorney Patented Nov. 24, 1925.

UNITED STATES PATENT OFFICE.

JOHN M. HAMMOND, OF PHILADELPHIA, PENNSYLVANIA.

METHOD AND APPARATUS FOR PRODUCING HALFTONE DOT IMAGES.

Application filed March 15, 1922. Serial No. 544,032.

*To all whom it may concern:*

Be it known that I, JOHN M. HAMMOND, a citizen of the United States, and resident of Philadelphia, in the county of Philadelphia and State of Pennsylvania, have invented certain new and useful Improvements in a Method and Apparatus for Producing Halftone Dot Images, of which the following is a specification.

My invention relates to a method and an apparatus for producing half-tone dot images.

In carrying out my invention, I employ a graded density screen either in a camera in place of the usual diaphragm or I may dispense with both the lens and diaphragm and use the graded density screen in a dark-box in conjunction with a half-tone screen, a source of light, a transparency and a sensitive surface.

In a method heretofore employed for producing half-tone dot images a camera was employed having the half-tone screen located therein with provision for adjustment in accordance with the size of the diaphragm, the focal extension and the character of ruling of the screen employed. These adjustments required exact calculations and expert workmanship to produce satisfactory results.

By my invention, I am enabled to simplify or eliminate these calculations and adjustments altogether, for, both in the camera and the dark-box the location of the screen may be fixed. Moreover, with the dark-box I am enabled to produce without the use of a lens a half-tone dot image from a continuous tone original more simply than with, and in a fraction of the time required for, the camera and with a small incandescent light in place of the usual arc lights.

Looking at the invention from a theoretical viewpoint the image formed by the aperture of the screen is essentially a "pin-hole" image of the diaphragm and accordingly there is formed behind each screen aperture an optical wedge which spreads in accordance with well-known sensitometric laws in the sensitive medium in accordance with the intensity of the light falling upon the aperture.

For a full understanding of my invention reference is had to the accompanying drawings, in which—

Fig. 1 is a view partly in elevation and partly in section of a camera having a half-tone screen therein and provided with a graded density screen in place of the usual diaphragm.

Fig. 2 is a longitudinal sectional view of a dark-box having a graded density screen in one end thereof.

Figs. 3, 4 and 5 are views of different types of graded density screens.

The same reference characters are used to indicate similar parts in the several views.

Referring to Fig. 1, the reference numeral 1 indicates a camera and 2 a copy board. The camera is provided with the usual lenses 3 and a graded density screen 4 which takes the place of the usual diaphragm. Towards the rear end of the camera is provided a half-tone screen 5 in front of a sensitive surface 6.

I have found that with the above apparatus a dot image of the subject whether direct from nature or a copy can be secured with the elimination of the calculations of the relation of size of diaphragm and screen distance, while the time of exposure must be calculated upon only one variable, which is the density of the transparency, a relatively easy quantity to measure.

Referring to Fig. 2, the reference numeral 7 indicates a simple dark-box having a graded density screen in one end thereof and having at the rear a half-tone screen 5, transparency 8 and sensitized medium 6. The transparency 8 may be either a negative or a positive. In view of the fact that no lenses are employed in this apparatus, a relatively weak source of light, such as a small incandescent bulb 9, may be employed.

The graded density screen may be of any desired shape, pattern or kind of gradation according to the character of dot desired. Thus, in Fig 3 is illustrated a graded density screen in which the gradation is from clear at the center 10 to black at the edge 11, whereas in Fig. 4 is illustrated a gradation from clear at the edge 12 to black at the center 13, and in Fig. 5 is illustrated a graded density aperture having the shape of a Maltese cross, the gradation varying from clear at the center 14 to dark at the edges 15.

Having now described my invention, what I claim as new and desire to secure by Letters Patent is:

1. The method of producing a half-tone dot image which comprises passing the light from the object to a sensitized medium through a graded density screen which is graded from the center outward and through a half-tone screen.

2. The method of producing a half-tone dot image which comprises passing the light from the object to a sensitized medium through a lens, a graded density screen which is graded from the center outward, and through a half-tone screen.

3. Apparatus for producing half-tone dot images, comprising a chamber for excluding the light, a lens and graded density screen graded from the center outward at one end of said chamber and a half-tone screen near the other end of the chamber, said chamber being adapted to receive a sensitized medium behind said half-tone screen.

4. Apparatus for producing half-tone dot images, comprising a chamber for excluding the light, a graded density screen graded from the center outward at one end of said chamber, a half-tone screen near the opposite end of said chamber, said chamber being adapted to receive a sensitized medium behind said screen.

Signed at Washington, in the District of Columbia this 14th day of March A. D. 1922.

JOHN M. HAMMOND.